(12) United States Patent
Ha et al.

(10) Patent No.: US 12,180,921 B2
(45) Date of Patent: Dec. 31, 2024

(54) RENEWABLE ENERGY GENERATION SYSTEM

(71) Applicants: Hyundai Motor Company, Seoul (KR); Kia Corporation, Seoul (KR)

(72) Inventors: Dong Hyun Ha, Seoul (KR); Jung Hun Choi, Hwaseong-si (KR); Jae Wung Jung, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/105,342

(22) Filed: Feb. 3, 2023

(65) Prior Publication Data

US 2023/0265823 A1 Aug. 24, 2023

(30) Foreign Application Priority Data

Feb. 21, 2022 (KR) .................. 10-2022-0022419

(51) Int. Cl.
*F03B 13/00* (2006.01)
*F03B 13/22* (2006.01)

(52) U.S. Cl.
CPC .................. *F03B 13/22* (2013.01)

(58) Field of Classification Search
CPC .......... F03B 13/22; F03B 13/14; F03B 11/00; F03B 13/20; F03B 13/264; H02J 7/0042; Y02E 10/30; B63B 35/44; B63B 2035/4466; F05B 2220/706; F05B 2240/93; F05B 2240/95
See application file for complete search history.

(56) References Cited

U.S. PATENT DOCUMENTS

| | | | |
|---|---|---|---|
| 2011/0049882 A1* | 3/2011 | Larsson ................ | H02J 7/1415 290/43 |
| 2013/0104538 A1* | 5/2013 | Yuck .................... | F03B 13/182 60/506 |
| 2016/0027308 A1* | 1/2016 | Hine ..................... | G08G 3/00 701/21 |
| 2019/0100108 A1* | 4/2019 | Davis ................... | B64U 80/84 |
| 2020/0385093 A1* | 12/2020 | Gordon ................. | B64U 80/84 |
| 2022/0090574 A1* | 3/2022 | Aliahmad ............ | F03B 13/1845 |

FOREIGN PATENT DOCUMENTS

KR 2021 0022276 A * 3/2021

* cited by examiner

*Primary Examiner* — Julio C. Gonzalez
(74) *Attorney, Agent, or Firm* — Morgan, Lewis & Bockius LLP

(57) ABSTRACT

A renewable energy storage that floats in the sea and is connected to a renewable energy power generator that produces power by converting wave energy into electrical energy, includes a housing configured to be connected to the renewable energy power generator using a cable; a first cabin configured to be coupled to or separated from a battery, which is configured to store the electrical energy; and a second cabin configured to be coupled to or separated from a transportation, which is configured to transfer the battery.

11 Claims, 4 Drawing Sheets

RENEWABLE ENERGY GENERATION SYSTEM

CROSS-REFERENCE TO RELATED APPLICATIONS

The present application claims priority to Korean Patent Application No. 10-2022-0022419, filed on Feb. 21, 2022, the entire contents of which is incorporated herein for all purposes by this reference.

BACKGROUND OF THE PRESENT DISCLOSURE

Field of the Present Disclosure

The present disclosure relates to a renewable energy generation system.

Description of Related Art

The description in the present section merely provides background information related to the present disclosure and does not necessarily form the related art.

Thermal power generation using chemical energy from fossil fuels to produce electric power, hydropower generation using the potential energy of water stored in dams, nuclear power generation using nuclear fission of uranium are among the most widely used technologies for producing electric power.

However, in recent years the proportion of renewable energy is being increased as an alternative to the three forms of power generation due to growing emphasis on resource depletion, safety problems, and eco-friendly values. Renewable energy is generated using endlessly renewable energy sources such as solar, solar thermal, tidal, wave, wind, geothermal, etc.

More than 70% of Earth's surface is sea, and especially because Korea is surrounded by sea on three sides and therefore a good environment to use the endlessly renewable energy carried by the sea, there is growing interest for wave power generation. Wave energy generation is the production of electrical energy using the periodic up-and-down motion of the surface of the sea caused by waves.

In the case of large-scale wave power generation there are spatial limitations to onshore installation. Also, installing a wave power generation device in distant seas and coastal and offshore waters comes with difficulties in energy transfer and requires installing costly subsea cables, incurring considerable expenses.

Furthermore, tidal power generation has a problem in that the efficiency is low because the output of electrical energy changes depending on the installation positions and directions of turbines.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a renewable energy storage that can produce and store power by converting wave energy into electrical energy in coastal and distant seas.

A renewable energy storage according to an exemplary embodiment can efficiently perform tidal power generation by adjusting the positions and directions of tidal power generation turbines.

The aspects of the present disclosure are not limited to the foregoing, and other aspects not mentioned herein will be able to be clearly understood to those skilled in the art from the following description.

An exemplary embodiment of the present disclosure provides a renewable energy storage that floats in the sea and is connected to a renewable energy power generator that produces power by converting wave energy into electrical energy, the renewable energy storage including: a housing configured to be connected to the renewable energy power generator using a cable; a first cabin configured to be coupled to or separated from a battery, which is configured to store the electrical energy; and a second cabin configured to be coupled to or separated from a transportation, which is configured to transfer the battery.

According to an exemplary embodiment of the present disclosure, the renewable energy storage may have an effect of increasing economic efficiency by producing and storing power by converting wave energy into electrical energy in coastal and distant seas without conditions that limit installation and by transferring battery storing electrical energy using a specific form of transportation without mounting an expensive submarine cable.

According to an exemplary embodiment of the present disclosure, the renewable energy storage efficiently performs tidal power generation by adjusting the positions and directions of tidal power generation turbines, configured to effectively produce electrical energy.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
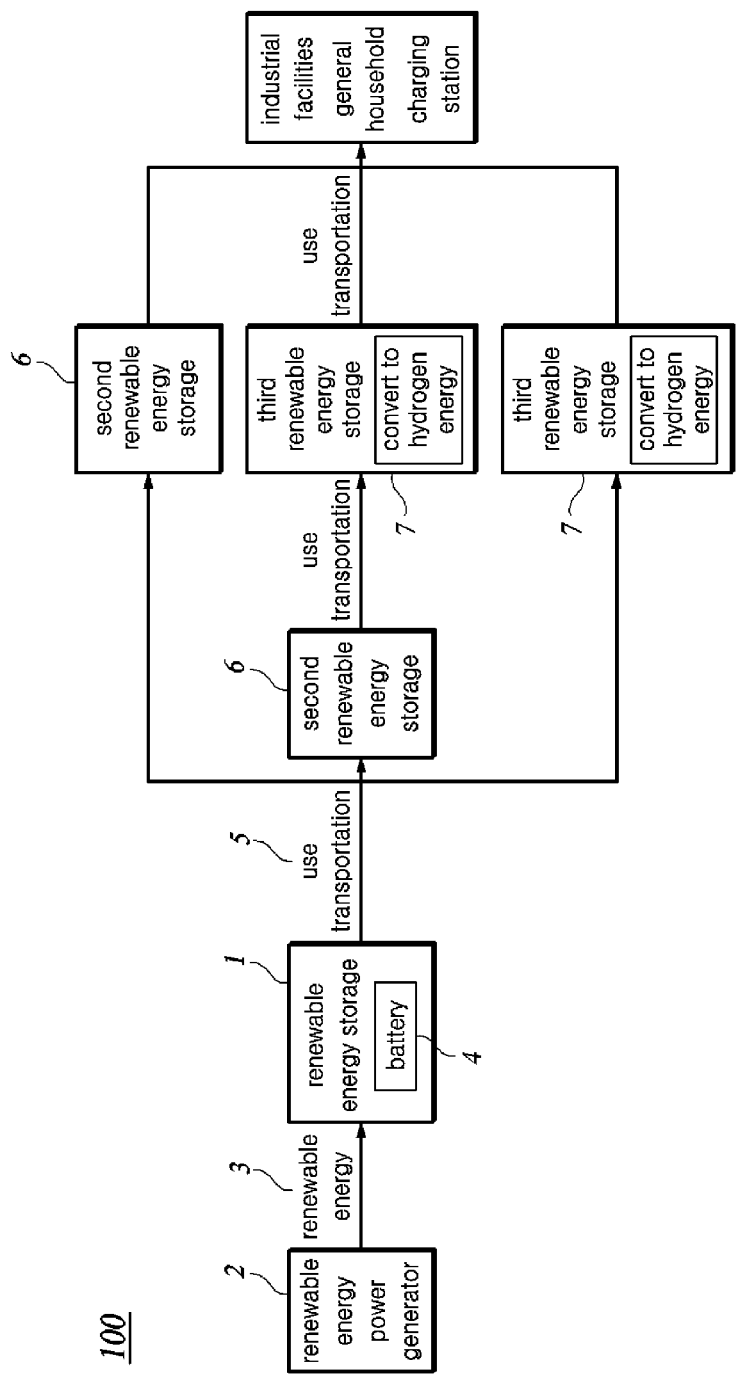
FIG. 1 is a block diagram of a renewable energy generation system that utilizes a renewable energy storage according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Some exemplary embodiments of the present disclosure are described below with reference to the accompanying drawings. In the following description, like reference numerals designate like elements, although the elements are shown in different drawings. Furthermore, in the following description of various exemplary embodiments of the present disclosure, a detailed description of known functions and configurations incorporated herein will be omitted for clarity and for brevity.

Additionally, alphanumeric codes such as first, second, i), ii), a), b), etc., in numbering components are used solely for differentiating one component from the other but not to imply or suggest the substances, the order, or sequence of the components. Throughout the present specification, when parts "include" or "comprise" a component, they are meant to further include other components, not excluding thereof unless there is a particular description contrary thereto.

FIG. 1 is a block diagram of a renewable energy generation system that utilizes a renewable energy storage according to an exemplary embodiment of the present disclosure.

Figure 2:
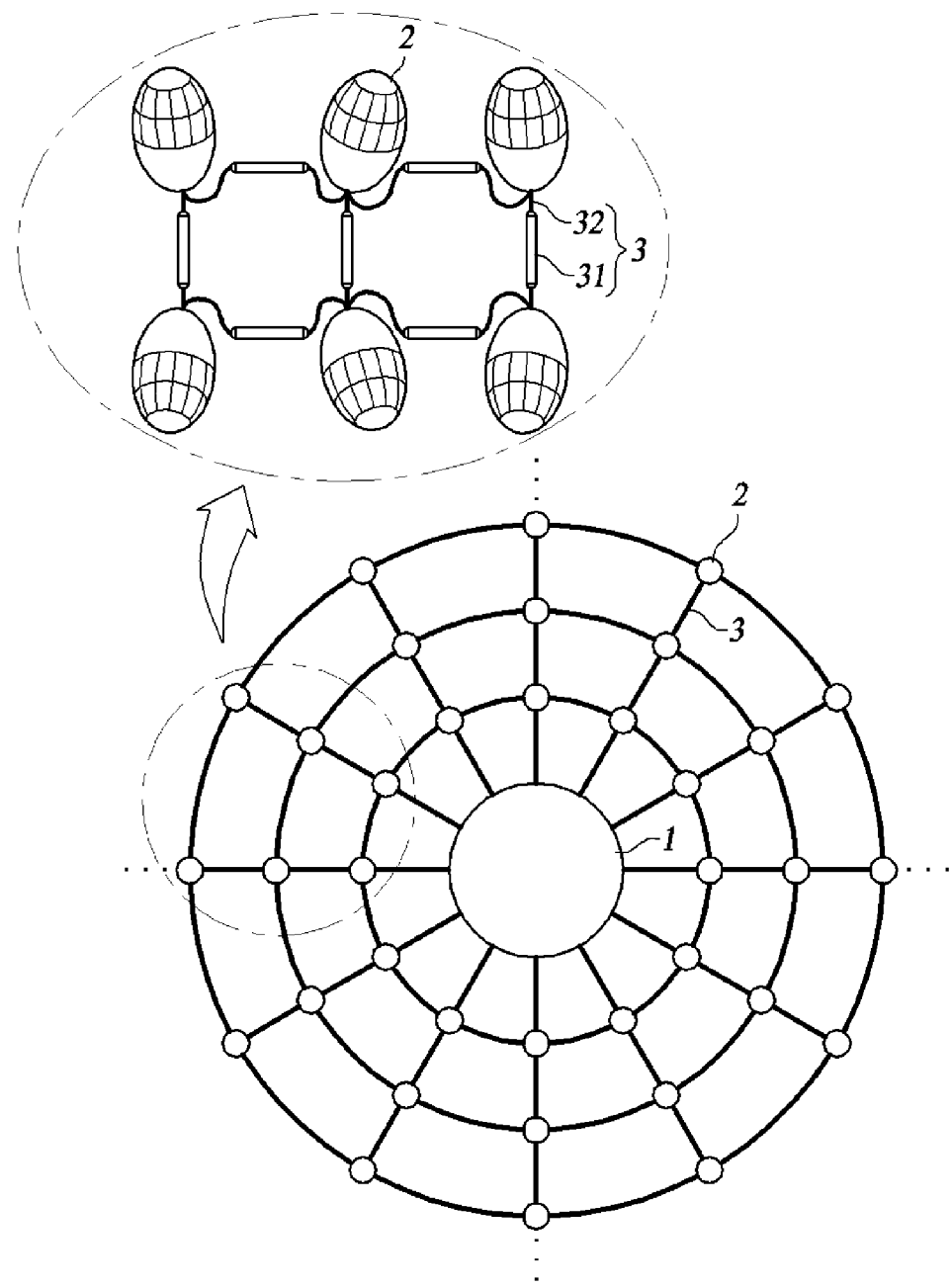
FIG. 2 is a diagram showing the connection relationship between a renewable energy storage and a renewable energy power generator according to an exemplary embodiment of the present disclosure.

FIG. 2 is a diagram showing the connection relationship between a renewable energy storage and a renewable energy generator according to an exemplary embodiment of the present disclosure.

Referring to FIG. 1, a renewable energy generation system includes all or some of a renewable energy power generator 2, a renewable energy storage 1, a second renewable energy storage 6, a third renewable energy storage 7, a cable 3, a battery 4, and a form of transportation 5.

A plurality of renewable energy generation systems 2 may be connected to each other by cables 3 and may float in coastal and distant seas. The plurality of renewable energy generation systems 2 may have a roly-poly-like capsule shape. Each of the renewable energy generation systems 2 may produce electric power by converting wave energy into electrical energy.

The renewable energy power generator 2 can produce power by converting wave energy into electrical energy using movement of a pendulum. The pendulum in the renewable energy power generator 2 is moved and the kinetic energy of the pendulum is converted into electrical energy by movement of waves.

A solar panel may be provided on the surface of the renewable energy power generator 2. A solar panel may be provided at the upper portion of the surface of the renewable energy power generator 2, that is, a portion which is not submerged in seawater. The renewable energy power generator 2 can not only convert wave energy into electrical energy, but also convert solar energy into electrical energy using the solar panel.

A controller of the renewable energy power generator 2 can control the renewable energy power generator 2 while taking into consideration the intensity, the rate, the frequency, etc. of waves. For example, the controller can increase the power generation efficiency of the renewable energy power generator 2 by rotating the renewable energy power generator 2 by taking into consideration the intensity, the rate, the frequency, etc. of waves. The controller can control behavior of the renewable energy power generator 2 to efficiently use various wave energies such as rolling, pitching, yawing, potential energy, and up, down, left and right kinetic energies.

The renewable energy storage 1 of the present disclosure may be positioned to be surrounded by a plurality of renewable energy power generators 2. The renewable energy storage 1 is connected to the plurality of renewable energy power generators 2 through the cables 3, configured to receive electrical energy from the plurality of renewable energy power generators 2.

The cable 3 may include a float unit 31 and a flexible unit 32. A first end portion of the flexible unit 32 may be connected to both end portions of the float unit 31. A second end portion of the flexible unit may be connected to the renewable energy power generator 2 or the renewable energy storage 1. The float units 31 float on the sea and can prevent a collision between the plurality of renewable energy power generators 2. The float unit 31 may include a stopper at both end portions. The stopper can attenuate shock which is applied to the renewable energy power generator 2 and the float unit 31 when the renewable energy power generator 2 and the float unit 31 collide with each other. The flexible unit 32 may be implemented in a wire type in order not to interfere with movement of the renewable energy power generator 2 that produces power.

The renewable energy storage 1 can receive and store electrical energy from the plurality of renewable energy power generators 2. The battery 4 and the form of transportation 5 that are coupled to the renewable energy storage 1 may be charged with the electrical energy transmitted to the renewable energy storage 1. The form of transportation may be an Unmanned Aerial Vehicle (UAV), an unmanned ship, a drone, etc.

The present disclosure is not limited to a single renewable energy generation system and a plurality of renewable energy generation systems may be collected, forming a cluster. The renewable energy storage 1 and the plurality of renewable energy power generators 2 surrounding the renewable energy storage 1 may form a first cluster. The second renewable energy storage 6 may be positioned to be surrounded by a plurality of first clusters. The second renewable energy storage 6 and the plurality of first clusters surrounding the second renewable energy storage 6 can form a second cluster. The third renewable energy storage 7 may be positioned to be surrounded by a plurality of second clusters. The third renewable energy storage 7 and the plurality of second clusters surrounding the third renewable energy storage 7 can form a third cluster. The structure of the renewable energy generation system is not limited thereto and may be contracted or expanded by accumulating a plurality of clusters.

The form of transportation 5 can transmit electrical energy among the first, second, and third clusters. In detail, the form of transportation 5 can transmit electrical energy by transferring the battery 4 among the renewable energy storage 1, the second renewable energy storage 6, and the third renewable energy storage 7. Furthermore, the form of transportation can transmit the battery 4 to the renewable energy storage 1, the second renewable energy storage 6, the third renewable energy storage 7, and a specific place on the ground. Here, the specific place may be Electric Vehicle (EV), Purpose Built Vehicle (PBV), Urban Air Mobility (UAM), robot and other future mobility, charging station, general household, and industrial facility, etc. For example, it is possible to connect a rechargeable eco-friendly vehicle with the power grid using Vehicle To Grid (V2G) and use the remaining power. By use of methods in which a power grid is used to charge an eco-friendly vehicle and re-supplying electricity remaining after driving back to the power grid, the eco-friendly vehicle can become a mobile ESS: Energy Storage System.

The renewable energy generation system can convert electrical energy into hydrogen energy and transfer the energy. When energy is stored for a long time period in renewable energy storage 1, second renewable energy storage 6, and third renewable energy storage 7, large amounts (more than 1 TWh) of energy may be stored. In the case of large amounts of energy, it is more suitable to store the energy as hydrogen energy instead of electrical energy. Furthermore, in long distance transfer, there is less energy loss in hydrogen energy than in electrical energy, and hydrogen energy is therefore especially more suitable for energy transfer between countries.

Referring to FIG. 2, a renewable energy storage 1 according to an exemplary embodiment of the present disclosure may be positioned to be surrounded by a plurality of renewable energy power generators 2. The renewable energy storage 1 is connected to a plurality of renewable energy power generators 2 through the cables 3, being able to receive electrical energy from the plurality of renewable energy power generators 2. The renewable energy storage 1 can receive and store electrical energy from the plurality of renewable energy power generators 2.

The plurality of renewable energy power generators 2 may be connected to each other in series and/or in parallel. The structure of the renewable energy generation system is not limited thereto, and the renewable energy storage 1 and a plurality of renewable energy power generators 2 may be connected to each other through various embodiments. It is possible to contract or expand the renewable energy generation system by connecting a plurality of renewable energy power generators 2, depending on the power generation capacity.

Figure 3:
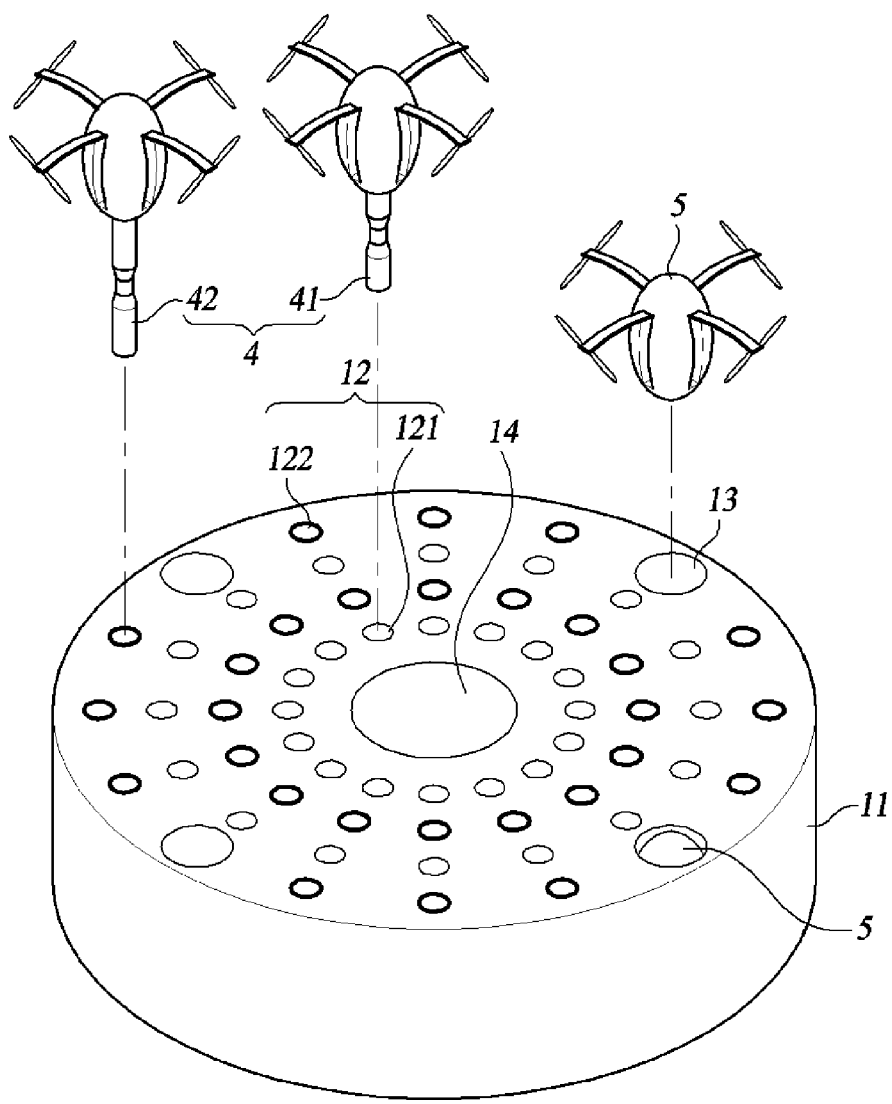
FIG. 3 is a perspective view of a renewable energy storage according to an exemplary embodiment of the present disclosure.

FIG. 3 is a perspective view of a renewable energy storage according to an exemplary embodiment of the present disclosure.

Referring to FIG. 3, the renewable energy storage 1 may include all or some of a housing 11, a first cabin 12, a second cabin 13, and a storage place 14.

The housing 11 may have a disc shape with a predetermined thickness. The housing 11 may be formed to float on the sea. That is, the housing 11 may be formed so that the upper end portion thereof is not submerged in the sea. A plurality of first cabins 12 and a plurality of second cabins 13 may be formed in the housing 11. The first cabins 12 and the second cabins 13 may be recessed on the top portion of the housing 11. The first cabins 12 and the second cabins 13 may be radially formed on the housing 11.

The first cabins 12 may be formed so that the batteries 4 may be coupled to or separated from the renewable energy storage 1. The first cabins 12 can receive electrical energy from a plurality of renewable energy power generators 2 and charge the batteries 4.

The batteries 4 of the present disclosure may be classified into short distance and long distance batteries according to their sizes. A distance may be determined to be "long" when the distance is equal to or longer than a predetermined distance, and the distance may be determined to be "short" when the distance is shorter than the predetermined distance. The first cabins 12 may include first cabins 121 for a long distance which batteries 41 for a long distance are coupled to or separated from and first cabins 122 for a short distance which batteries 42 for a short distance are coupled to or separated from. The form of transportation 5 can select between batteries 41 for a long distance and batteries 42 for a short distance by taking into consideration the weather situation and the transfer distance and then transport the batteries 4. The form of transportation 5 can approach the first cabins 12 and mount or recover the batteries 4.

The plurality of second cabins 13 may be formed so that the forms of transportation 5 may be coupled and separated. The second cabins 13 can receive electrical energy from a plurality of renewable energy power generators 2 and charge the forms of transportation 5.

The storage place 14 may be positioned at the center portion of the renewable energy storage 1. A form of transportation 5 such as a UAM and a UAV that transfers the battery 4 may be charged and stored in the storage place.

The first cabins 12 and the second cabins 13 may be recessed on the renewable energy storage 1. The first cabin 12 may have the shape of the battery 4 so that the battery 4 may be coupled and separated. For example, the first cabin 121 for a long-distance to which the battery 41 for a long distance is coupled to or separated from and first cabin 122 for a short distance to which the battery 42 for a short distance is coupled to or separated from may each be formed to fit to the size of the batteries 4.

The second cabin 13 may have the shape of the form of transportation 5 so that the form of transportation 5 may be coupled and separated. For example, the second cabin 13 may include a specific space in which wings of the form of transportation 5, etc. may be accommodated.

Figure 4:
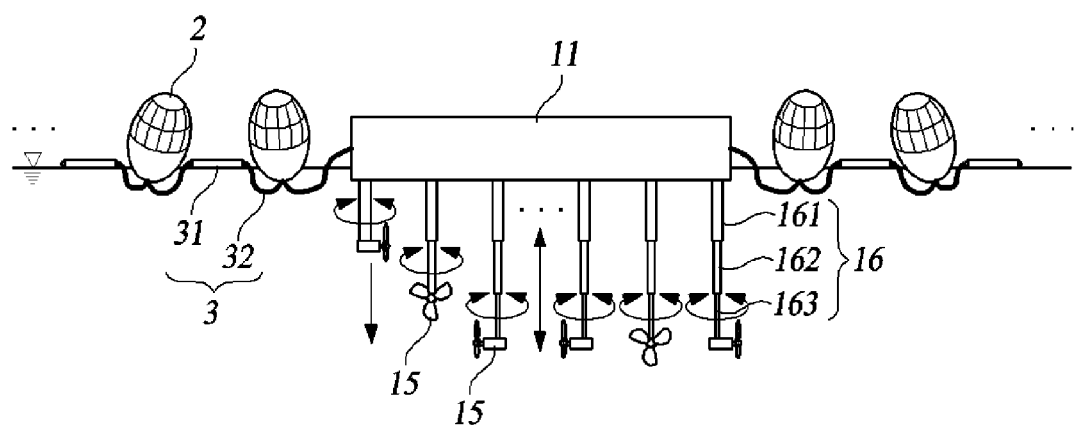
FIG. 4 is a diagram showing a renewable energy storage provided with turbines according to an exemplary embodiment of the present disclosure.

FIG. 4 is a diagram showing a renewable energy storage provided with turbines according to an exemplary embodiment of the present disclosure.

Referring to FIG. 4, the renewable energy storage 1 of the present disclosure may further include a turbine 15 and a connecting member 16.

The turbine 15 can additionally produce electrical energy by converting a horizontal motion of sea currents into a rotation motion. The turbine 15 may include a motor for additionally producing electrical energy using tidal power generation. The motor may be used not only as a power generation motor which is used to produce electrical energy, but also as a propulsion motor for propelling the renewable energy storage 1. That is, the turbine may include one motor for both power generation and driving.

The connecting member 16 may be connected to the bottom portion of the housing 11. The connecting member 16 can connect the turbine 15 and the housing 11. A first end portion of the connecting member 16 may be coupled to the housing 11 and a second end portion thereof may be coupled to the turbine 15.

The connecting member 16 may be configured so that the length thereof is adjustable. The renewable energy storage 1 is configured to determine the most appropriate depth at which efficient tidal power generation is possible by analyzing flow rate data depending on place, time, etc. The length of the connecting member 16 may be adjusted so that tidal power generation is possible at the most appropriate depth. It is possible to produce electrical energy using the turbine 15 at the most appropriate depth by adjusting the length of the connecting member 16.

The connecting member 16 may include all or some of a first frame 161, a second frame 162, and a third frame 163. An end portion of the first frame 161 may be coupled to the housing 11. The first frame 161 to the third frame 163 may be configured in a telescopic configuration and may be connected so that they may be inserted into and moved out of each other. Since the first frame 161 to the third frame 163 are connected so that they may be inserted into and moved out of each other, the length of the connecting member 16 may be adjusted.

The connecting member 16 may be rotatably coupled to the housing 11. Because the connecting member 16 is rotatably coupled, the turbine 15 may be rotated in accordance with the direction of sea currents. By rotating the turbine 15 in accordance with the direction of sea currents, it is possible to effectively produce electrical energy using tidal power generation. Furthermore, when the motor of the turbine 15 is used as a propulsion motor, it is possible to adjust the direction of the renewable energy storage 1 by rotating the turbine 15.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A renewable energy storage apparatus that floats in the sea and is connected to a renewable energy power generator that produces power by converting wave energy into electrical energy, the renewable energy storage apparatus comprising:
   a housing configured to be connected to the renewable energy power generator using a cable;
   a turbine configured to convert a horizontal motion of sea currents into rotational motion for tidal power generation and including a motor configured to produce electrical energy by converting the rotational motion of the turbine and to function as a propulsion motor for propelling the renewable energy storage apparatus,
   wherein, the housing includes a first adaptive coupling portion formed on an upper surface of the housing, and a second adaptive coupling portion formed on the upper surface of the housing,
   wherein a battery configured to store the electrical energy is moved to be coupled to or separated from the first adaptive coupling portion by a transportation,
   wherein the transportation is moved to be coupled to or separated from the second adaptive coupling portion, the transportation being capable of coupling to the second adaptive coupling portion, wherein the renewable energy power generator is connected to the housing through a cable, and wherein the renewable energy storage apparatus is configured to receive and store electrical energy from the renewable energy power generator and subsequently charge and transfer the electrical energy to both the battery and the transportation.

2. The renewable energy storage apparatus of claim 1, further including a connecting member coupled to a bottom portion of the housing, and connecting the turbine and the housing.

3. The renewable energy storage apparatus of claim 2, wherein the connecting member is configured so that a length thereof is adjustable.

4. The renewable energy storage apparatus of claim 3, wherein the connecting member includes at least two frames telescopically coupled therebetween.

5. The renewable energy storage apparatus of claim 4, wherein the at least two frames include:
- a first frame connected to the housing;
- a second frame slidably coupled to the first frame; and
- a third frame slidably coupled to the second frame,
- wherein the first frame, the second frame and the third frame are telescopically coupled to each other so that the first frame, the second frame and the third frame are configured to be selectively inserted into or moved out of each other.

6. The renewable energy storage apparatus of claim 2, wherein the connecting member is rotatably coupled to the housing.

7. The renewable energy storage apparatus of claim 1, wherein the housing floats in the sea and has a shape of a disc.

8. The renewable energy storage apparatus of claim 1, further including a storage place configured so that the transportation is charged therefrom and stored therein.

9. The renewable energy storage apparatus of claim 1, wherein the renewable energy power generator has a roly-poly-like capsule shape.

10. The renewable energy storage apparatus of claim 9,
wherein the renewable energy power generator is in plural, and
wherein the plurality of renewable energy power generators are connected to each other in series or in parallel and are configured to surround the renewable energy storage apparatus.

11. The renewable energy storage apparatus of claim 1,
wherein the renewable energy power generator is in plural, and
wherein the plurality of renewable energy power generators are connected to each other in series or in parallel and are configured to surround the renewable energy storage apparatus.

* * * * *